United States Patent

Borman et al.

[15] 3,642,107
[45] Feb. 15, 1972

[54] TRANSMISSION DRIVE ESTABLISHING CONTROL

[72] Inventors: August H. Borman, Livonia; Lawrence E. Green, Ann Arbor; Quinby E. Wonn, Plymouth, all of Mich.

[73] Assignee: General Motors Corporation, Detroit, Mich.

[22] Filed: May 13, 1970

[21] Appl. No.: 36,847

[52] U.S. Cl. ................... 192/103 F, 192/85 AA, 192/103 C
[51] Int. Cl. ..................................................... F16d 23/10
[58] Field of Search ............... 192/103 C, 103 F, 109 F, 85 R, 192/54

[56] References Cited

UNITED STATES PATENTS 2,739,679   3/1956   Randol ................................. 192/54

*Primary Examiner*—Mark M. Newman
*Assistant Examiner*—Randall Heald
*Attorney*—W. E. Finken, A. M. Heiter and R. L. Phillips

[57] ABSTRACT

A pressure control for controlling the pressure in a fluid motor that operates a drive establishing device of a vehicle transmission. The control operates to provide smooth drive establishment by controlling the pressure in the fluid motor during drive engagement at a level that causes a transmission component whose speed changes during the drive establishment to change speed at a substantially constant rate.

2 Claims, 3 Drawing Figures

PATENTED FEB 15 1972

3,642,107

INVENTORS
August H. Borman,
Lawrence E. Green &
Quinby E. Wonn
BY Ronald L. Phillips
ATTORNEY

TRANSMISSION DRIVE ESTABLISHING CONTROL

This invention relates to transmission drive establishing device controls and more particularly to pressure controls for the fluid motors that operate vehicular transmission drive establishing devices.

The control according to the present invention is illustrated in a transmission having a friction brake that is operable to establish a drive on the supply of fluid pressure to a fluid that engages the brake. Fluid pressure supply to the fluid motor for drive establishment and also fluid pressure exhaust therefrom for releasing the drive is normally controlled by a shift valve. The pressure control according to the present invention includes a control member having a speed that changes during the establishment of the drive. This control member operates a pressure regulator to cause the pressure of the fluid supplied to the fluid motor to be controlled with time at a level that effects a substantially constant rate of change in the speed of this control member during the establishment of the drive. Thus, inertia is used to control the rate at which the drive is established. In addition, a centrifugal effect is combined with the inertial effect on the pressure regulator valve to assure smooth engagement for light throttle shifting and also heavy throttle shifting by providing for the average rate of change of speed to vary from a low rate during light throttle shifting to a high rate during heavy throttle shifting.

An object of the present invention is to provide a new and improved transmission drive establishing device control.

Another object is to provide a pressure control for the fluid motor of a transmission drive establishing device wherein the pressure is controlled with time at a level that effects a substantially constant rate of change in the speed of a member in the transmission whose speed changes during the establishment of the drive.

Another object is to provide a fluid pressure control that controls the drive-engaging pressure in a transmission at a level that effects a substantially constant rate of speed change of a transmission member that changes speed during the drive establishment with this rate varying with the speed of this transmission member.

Another object is to provide both an inertial effect and a centrifugal effect for controlling the pressure buildup in the fluid motor of a transmission drive establishing device so that the rate of change of speed of a transmission component whose rate of change of speed is controlled by operation of this device is changed at a rate that is modulated by the speed of this transmission component.

Another object is to provide in a transmission a drive that is established by operation of a fluid motor wherein the pressure level in the fluid motor to establish the drive is controlled by an inertia effect and also centrifugal effect to provide for smooth transmission shifting.

These and other objects of the present invention will be more apparent from the following description and drawing in which:

FIG. 1 schematically illustrates a transmission arrangement including drive train and control having the transmission drive establishing device control according to the present invention.

Figure 1:
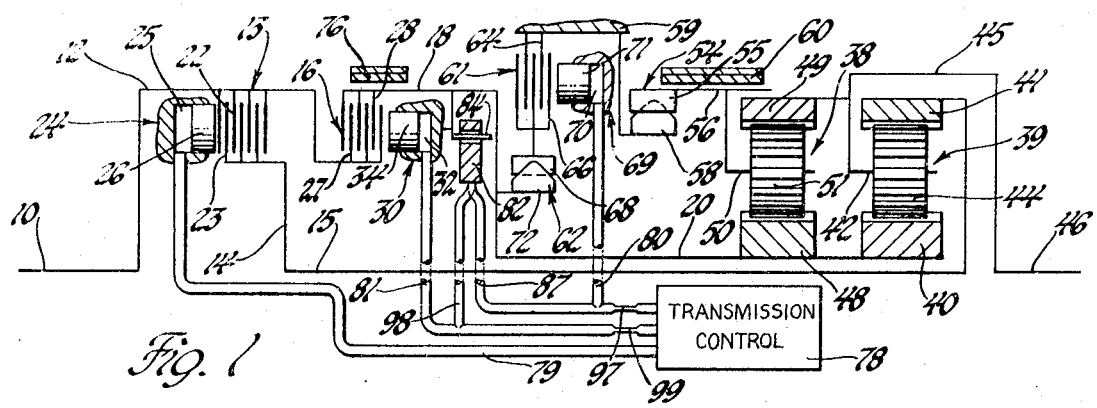

The transmission drive establishing device control according to the present invention is shown incorporated for use in the transmission arrangement shown in FIG. 1. This transmission arrangement is operable to provide three forward speed range drives, neutral and a reverse drive.

The transmission's drive train shown in FIG. 1 comprises an input shaft 10 which is adapted to be connected by a conventional hydrodynamic torque converter to the vehicle's engine, both the converter and engine not being shown. The input shaft 10 is connected to a drum 12 which may be clutched by a clutch 13 to a hub 14 that is connected to a shaft 15. Input shaft 10 may also be clutched by a clutch 16 to a drum 18 that is connected to a sleeve shaft 20 through which shaft 15 extends.

The clutch 13 comprises drive plates 22 which are connected by splines to drum 12 and are adapted to engage driven plates 23 which are connected to hub 14. A fluid motor 24 has a fluid chamber 25 that, when supplied with fluid pressure, provides for forcing a piston 26 to engage the clutch plates 22 and 23 to clutch shaft 10 to shaft 15. When chamber 25 is exhausted of fluid pressure, the clutch 13 is released with the piston 26 being returned to its release position by retraction springs, not shown.

Figure 2:
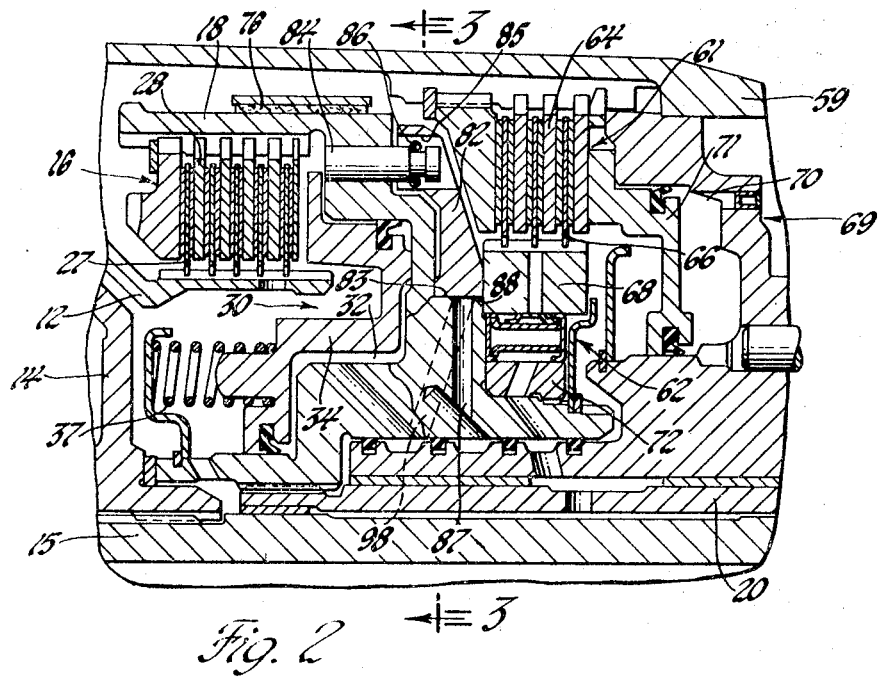
FIG. 2 is a longitudinal sectional view of an actual construction of the transmission drive establishing device control in the transmission arrangement shown in FIG. 1.

The clutch 16 as shown in both FIGS. 1 and 2 comprises drive plates 27 which are connected by splines to drum 12 and are adapted to engage driven plates 28 which are connected by splines to drum 18. A fluid motor 30 has a chamber 32 which, when supplied with fluid pressure, provides for forcing a piston 34 to engage plates 27 and 28 to clutch input shaft 10 to shaft 20. When fluid pressure is exhausted from chamber 32, the clutch 16 is released permitting retraction springs 37 to return the piston 34 to its release position.

The shafts 15 and 20 are connected to the transmission's gearing which comprises a pair of planetary gearsets 38 and 39. The gearset 39 comprises an annular sun gear 40, a gear ring 41 and a planet carrier 42 carrying pinions 44 in mesh with sun gear 40 and ring gear 41. Ring gear 41 is connected to shaft 15, sun gear 40 is connected to shaft 20 and carrier 42 is connected by a drum 45 to a shaft 46 which is the transmission's output shaft.

The gearset 38 comprises an annular sun gear 48, a ring gear 49 and a planet carrier 50 carrying pinions 51 in mesh with sun gear 48 and ring gear 49. Sun gear 48 is connected to shaft 20 and thus also to the other sun gear 40 and ring gear 49 is connected to drum 45 and thus to carrier 42 and output shaft 46.

A one-way brake 54 is for preventing reverse rotation of carrier 50 in gearset 38. One-way brake 54 comprises an outer race 55 which is connected by a drum 56 to carrier 50. This brake's inner race 58 is grounded to the transmission's housing which is generally designated as 59. The one-way brake 54 may be of any suitable conventional type and operates to permit free forward rotation of carrier 50 and prevent reverse rotation thereof. A band brake 60 grounded to the transmission housing 59 and operated by any suitable fluid pressure operated motor is adapted to engage drum 56 to hold carrier 50 against rotation in either direction.

The sun gears 40 and 48 may be selectively prevented from only reverse rotation by a brake 61 and a one-way brake 62 in series therewith. The brake 61 comprises plates 64 which are connected by splines to the transmission housing 59 and are adapted to engage plates 66 which are connected by splines to outer race 68 of the one-way brake 62. A fluid motor 69 has a chamber 70 which, when supplied with fluid pressure, provides for forcing a piston 71 to engage plates 64 and 66 to brake the outer race 68 of the one-way brake 62. This one-way brake's inner race 72 is connected to drum 18 and thus to shaft 20 and sun gears 40 and 48. Thus, when brake 61 is engaged, the one-way brake 62 operates to prevent reverse rotation of sun gears 40 and 48. The one-way brake 62 may be of any suitable conventional type such as the sprag type shown. A band brake 76 grounded to the transmission housing 59 and operated by any suitable fluid pressure operated motor is adapted to engage drum 18 to hold sun gears 40 and 48 against rotation in either direction.

The drive-establishing devices in the above-described transmission drive train may be operated to establish three forward speed range drives, neutral and a reverse speed range drive by a transmission control 78 which may be of any suitable conventional type. One suitable transmission control for this transmission arrangement is disclosed in U.S. Pat. No. 3,321,057 entitled "Transmission and Control System" issued to Winchell et al. on May 23, 1967. The transmission control 78 by operation of a manual valve and shift valves controls the delivery of fluid at a regulated pressure to the fluid motors that operate the various drive-establishing devices to effect the different transmission drives. For neutral, all of the clutches and brakes are caused to be released by the transmission control 78 and no power can be transmitted from input shaft 10 to output shaft 46.

The first and lowest forward speed range drive is established by the transmission control 78 delivering fluid pressure via a passage 79 to fluid motor 24 to engage clutch 13. Torque from the forwardly rotating input shaft 10 is delivered through the engaged clutch 13 to drive ring gear 41 forwardly. Assuming a load on output shaft 46 and thus on carrier 42, this carrier tends to remain stationary so that sun gears 40 and 48 are driven in reverse. In gear unit 38, torque input to pinions 51 from sun gear 48 tends to cause carrier 50 to rotate backwardly, but such rotation is prevented by one-way brake 54. Pinions 51 therefore drive ring gear 49 and thus output shaft 46 at a reduced speed in the forward direction. Because of the action of one-way brake 54, power cannot be transmitted backwardly through the drive train. Thus, for engine braking in low drive, the band brake 60 is engaged by the transmission control 78 providing fluid pressure supply to this brake's fluid motor to hold carrier 50 against rotation in the forward direction.

The second and next higher forward speed range drive is established by retaining engagement of clutch 13 and engaging brake 61 by the transmission control 78 delivering fluid pressure via a passage 80 to fluid motor 69. Torque thus remains applied to ring gear 41 but now with sun gear 40 held against reverse rotation by one-way brake 62, carrier 42 and thus output shaft 46 are driven forwardly at a reduced speed but in a speed range higher than that obtainable in the low drive. Since one-way brake 62 permits forward rotation of sun gear 40, power cannot be transmitted in the reverse direction. Thus, for engine braking in this drive, the band brake 76 is engaged by the transmission control 78 delivering fluid pressure to this brake's fluid motor. Then, with sun gear 40 thus held against forward rotation, engine braking is thereby made available in this drive.

The third and highest forward speed range drive is established by maintaining engagement of clutch 13 and engaging clutch 16 by the transmission control 78 supplying fluid pressure via a passage 81 to fluid motor 30. The brake 61 may remain engaged since one-way brake 62 permits forward rotation of drum 18 and thus permits forward rotation of sun gears 40 and 48. Since both ring gear 41 and sun gear 40 are driven at the same speed and in the same direction, gearset 39 is locked up to provide a 1:1 speed ratio or direct drive to drive output shaft 46.

The above sequential operation demonstrates how upshifts are effected. Downshifts are effected by reversing this sequence.

Reverse speed range drive is obtained by engaging clutch 16 by the transmission control 78 supplying fluid pressure to fluid motor 30 and in addition engaging the band brake 60 by the transmission control 78 also supplying fluid pressure to this brake's fluid motor. With clutch 16 thus engaged, the sun gear 48 is driven forwardly and since carrier 50 is held by brake 60, the pinions 51 drive ring gear 49 and connected output shaft 46 in the reverse direction and at a reduced speed.

The transmission drive establishing device control according to the present invention is incorporated in the above-described transmission arrangement to provide control over the pressure in fluid motor 69 and also over the pressure in fluid motor 30 to provide for smooth establishment of the intermediate speed range drive and also smooth establishment of the high-speed range drive. The present control comprises, as shown schematically in FIG. 1 and as shown in detail in FIGS. 2 and 3, a ring-shaped member 82 which may also be termed an inertia ring for reasons which will become more apparent later. The inertia ring 82 is piloted on a cylindrical shoulder 83 formed on drum 18 and is retained thereon by being sandwiched between the drum 18 and the outer race 68 of the one-way brake 62 as best shown in FIG. 2. Inertia ring 82 is caused to rotate with drum 18 or to be held stationary with this drum and is also permitted limited angular movement relative to this drum by a cylindrical pin 84 which is secured to drum 18 and extends into a circular hole 85 of larger diameter provided in ring 82. An O-ring 86 is mounted in an annular groove provided on the portion of pin 84 within hole 85 and is preferably made of a material such as rubber or plastic to prevent metal-to-metal contact between pin 84 and ring 82 and thus avoid metal pounding and also reduce the noise of their contact.

Figure 3:
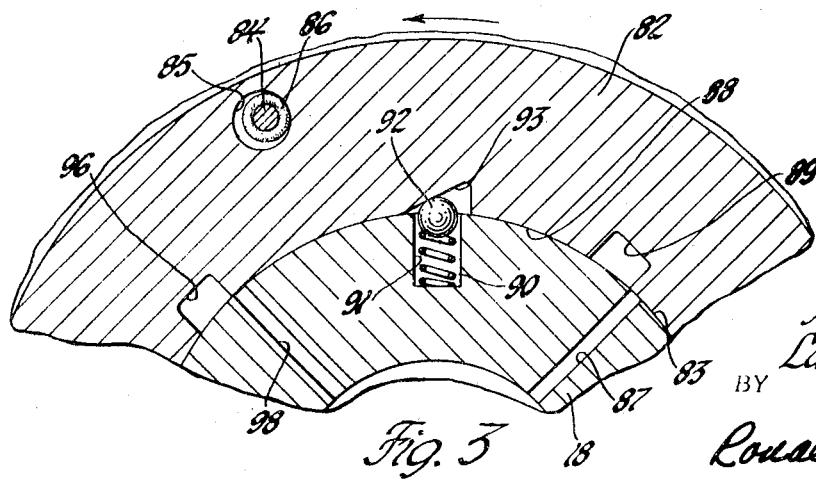
FIG. 3 is a view taken on the line 3—3 in FIG. 2.

The ring 82 and drum 18 have separate pressure regulator valve means for separately controlling the pressure buildup in the fluid motors 30 and 69. The valve means for fluid motor 69 comprises a bleed or exhaust passage 87 that is connected to passage 80 and thus to chamber 70 of fluid motor 69. As best shown in FIG. 3, the inner surface 88 of inertia ring 82 provides for closing and opening the bleed passage 87 to an exhaust port 89 formed in the inertia ring 82, the bleed passage 87 extending radially outward through drum 18 and through the cylindrical surface of shoulder 83 for this purpose. The exhaust port 89 is open to the interior of the transmission housing 59 which drains to the transmission control's sump. A spring 90 mounted in a radially inward extending pocket 91 in drum 18 biases a ball 92 against a ramp 93 provided on the interior of ring 82. As viewed in FIG. 3, the forward direction referred to in the description of transmission operation described above is in the counterclockwise direction indicated by the arrow. The spring-biased ball 92 acting against ramp 93 provides a torque urging ring 82 counterclockwise or in the forward direction relative to drum 18 to the position shown which will be referred to as the closed valve position and is determined by the ring 82 contacting the stop provided by pin 84 with its O-ring 86. In the closed valve position, the inertia ring 82 acting as a valve member blocks the bleed passage 87 from exhaust port 89. Thus, in this closed valve position, pressure can build in chamber 70 of fluid motor 69 to the full regulated pressure provided from the transmission control 78. Alternatively, when the inertia ring 82 is caused to rotate clockwise or in the reverse direction relative to drum 18 as the result of this ring's inertia as described in more detail later, there is provided an opening between bleed passage 87 and exhaust port 89 which opening increases in size with increasing relative angular movement between these members with the full extent of this opening in what will be described as the fully open valve position being determined by the O-ring 86 on pin 84 contacting the opposite side of the wall of hole 85. Thus, there is provided a variable throttle connection between the bleed passage 87 and exhaust port 89 effective to control the pressure in chamber 70 of motor 69. An orifice 97 located in the passage between transmission control 78 and passage 80 limits the flow of fluid so that a relatively low pressure can be achieved in chamber 70 in the fully open valve position.

The pressure regulator valve means for controlling the pressure in fluid motor 30 is similar to that for fluid motor 69 and comprises a bleed passage 98 that is connected to passage 81 and thus to chamber 32 of fluid motor 30. When inertia ring 82 is in the closed valve position previously described, the bleed passage 98 which extends through the surface of shoulder 83 is blocked from an exhaust port 96 in ring 82 by ring's inner surface 88. This permits pressure in chamber 33 to build to the full value. Alternatively, when the inertia ring 82 moves counterclockwise relative to drum 18 towards the fully open valve position previously described, the bleed passage 98 is opened to exhaust port 96 by a throttle connection whose flow area increases with increasing relative movement between ring 82 and drum 18. An orifice 99 located in the passage between transmission control 78 and passage 81 limits the flow of fluid so that a relatively low pressure can be achieved in chamber 32 in the fully open valve position.

It will now be recalled that in the low speed range drive the sun gear 48 and connected drum 18 and thus inertia ring 82 rotate in the reverse direction which is counterclockwise as viewed in FIG. 3 and that this drum and thus the inertia ring is braked to a stop to establish the intermediate speed range drive. According to the present invention, the bias of spring 90 provides a torque to normally hold the ring 82 in the closed valve position against the stop so that in the steady state condition when there is no acceleration of drum 18, the bleed passage 87 is blocked from exhaust port 89. Then when an upshift to the intermediate speed range drive is initiated by the transmission control 78 which for this establishment then directs the delivery of fluid pressure to fluid motor 69, the brake 61 starts to engage as pressure starts to build in chamber 70. During this drive establishment the inertia ring 82 resists deceleration thereof caused by braking of drum 18 and this inertia provides an inertia torque that opposes the spring torque on ring 82. According to the present invention, the spring-applied torque is made equal to the inertia-induced torque so that these opposing torques on ring 82 balance each other to provide regulation over the opening of bleed passage 87 to exhaust port 89 and thus regulation of the pressure in chamber 70 of fluid motor 69. By this torque balance on ring 82, the deceleration rate of ring 82 that occurs during this drive establishment is made constant or substantially constant since the inertia-induced torque is the product of the ring's moment of inertia and deceleration rate.

Describing this pressure control in more detail, as fluid is delivered to chamber 70 and pressure begins to build on filling of this chamber, the engaging force engaging brake 61 causes drum 18 and thus inertia ring 82 to slow down or decelerate. On such deceleration and with the resulting inertia torque on ring 82 balanced by the spring-applied torque, the ring 82 acts to regulate the opening of bleed passage 87 to exhaust port 89 to maintain the pressure in chamber 70 at that value that is required to establish a constant deceleration rate of ring 82. For example, if the brake engagement becomes too aggressive the ring 82 whose inertia is resisting the forced speed decrease will rotate clockwise relative to drum 18 through a few degrees to open bleed passage 87 to exhaust port 89 to relieve the brake apply pressure. Alternatively, if the brake engagement is too soft the bleed passage 87 will remain blocked by no relative movement of ring 82 to increase the brake apply pressure. Thus the brake apply pressure is caused to regulate with time during brake engagement at a rate that effects a constant or substantially constant change in speed or deceleration of inertia ring 82 with the result that there is provided a very smooth establishment of the transmission's intermediate speed range drive. At the completion of the drive establishment, the inertia torque drops to zero and the spring applied torque again holds the inertia ring 82 in its closed valve position blocking bleed passage 87 from exhaust port 96 and the brake apply pressure is thus at the full value.

It has also been found that if the rate of drive engagement is constant at all engine throttle openings, there may occur firm light engine throttle shifts and also soft heavy throttle shifts. The rate of drive establishment provided by the inertial control described previously is substantially a lineal function if the centrifugal force on ball 92 is not substantial. To avoid such firm and soft shifts, the mass of ball 92 is made a substantial amount so that the centrifugal force acting on the ball 92 will modulate the spring torque acting on ring 82 and thus will modulate the deceleration rate provided by the inertia control previously discussed so that this rate varies with the speed of drum 18 and thus during the shift interval. Thus, on the upshift to intermediate drive and with the drum 18 and thus ball 92 rotating at the initiation of this shift, the centrifugal force on ball 92 provides a significant addition to the spring force to thereby increase the bias urging closing of the bleed passage 87 to exhaust port 89. This increases the initial rate of pressure buildup in fluid motor 70 so that the deceleration rate of drum 18 starts at an increased or faster rate and decreases with decreasing drum speed to a slower rate during this transmission shift. It has been found that such centrifugal modulation provides a better shift feel for the upshift to intermediate drive than inertia control alone by increasing the average rate of deceleration during high-speed shifts to a greater rate than the average rate of deceleration during lower speed shifts.

On an upshift from intermediate to the high-speed range drive, the drum 18 and thus ring 82 are accelerated from zero speed to input speed. Prior to such an upshift, the inertia ring 82 will be in its closed valve position shown in FIG. 3 with bleed passage 98 blocked from exhaust port 96. Then when the transmission control 78 delivers fluid under pressure to fluid motor 30 and as the clutch 16 starts to engage on pressure buildup in this motor, the drum 18 is accelerated in the counterclockwise direction. The inertia ring 82 tends to remain stationary with its inertia torque caused by the acceleration opposed by the spring-applied torque which latter torque resists opening of the bleed passage 98 to exhaust port 96. Thus, there is provided an inertia-controlled level of pressure in fluid motor 30 to engage the clutch 16 similar to that described previously controlling the brake 61. The centrifugal force modulation of the inertia-controlled rate of engagement of clutch 13 is opposite that provided for brake 61 since the drum 18 and thus ring 82 are accelerating from zero speed on establishment of the high drive whereas they were decelerating on the upshift to the intermediate drive. Thus, on the upshift to high drive the inertia-controlled acceleration rate is low initially and increases with increasing drum speed to a higher rate during this transmission shift. It has been found that such centrifugal modulation provides a better shift feel for the upshift to high drive than inertia control alone by increasing the average rate of acceleration during high-speed shifts to a greater rate than the average rate of acceleration during lower speed shifts.

The above-described embodiment is illustrative of the invention which may be modified within the scope of the appended claims.

We claim:

1. In combination, drive-establishing means operable to establish a drive, fluid motor means for operating said drive-establishing means to establish said drive, a source of fluid at a predetermined pressure, drive selection control means for controlling delivery of said fluid to said fluid motor means to operate said drive-establishing means to establish said drive and also for exhausting fluid from said fluid motor means to release said drive, and pressure control means including inertia means having a speed which changes during the establishment of said drive and centrifugal means having a speed which also changes during the establishment of said drive for causing the pressure of the fluid in said fluid motor means to be regulated with time at a level that effects an inertial controlled rate of change in speed of said inertia means during the establishment of said drive.

2. In combination, drive-establishing means operable to establish a drive, fluid motor means for operating said drive-establishing means to establish said drive, a source of fluid under pressure, drive selection control means for controlling delivery of said fluid to said fluid motor means to operate said drive-establishing means to establish said drive and also for exhausting fluid from said fluid motor means to release said drive, pressure control means including rotary inertia means having a speed that changes during the establishment of said drive for causing the pressure of the fluid in said fluid motor means to be controlled with time at a level that effects a controlled rate of change in the speed of said inertia means during the establishment of said drive, said pressure control means further including a rotary member having a speed that changes during the establishment of said drive, means limiting movement of said inertia means relative to said rotary member, said inertia means and said rotary member having valve means operable to prevent fluid pressure exhaust from said fluid motor means when said inertia means is in one position relative to said rotary member and also operable to provide increasing pressure exhaust from said fluid motor means when said inertia means moves in one direction from said one position to another relative position, and biasing means including spring means and centrifugal force effect means rotatable with said rotary member for normally holding said inertia means in said one relative position when the speed of said rotary member is substantially constant and for permitting said inertia means to move by its inertia in said one direction toward said other relative position to regulate the pressure in said fluid motor means when the speed of said rotary member is changing during establishment of said drive.

* * * * *